US007381133B2

(12) United States Patent
Thomas

(10) Patent No.: US 7,381,133 B2

(45) Date of Patent: Jun. 3, 2008

(54) GAMING MACHINE HAVING A PICK AND SPIN BONUS SCHEME

(75) Inventor: Alfred Thomas, Las Vegas, NV (US)

(73) Assignee: WMS Gaming Inc., Chicago, IL (US)

( * ) Notice: Subject to any disclaimer, the term of this patent is extended or adjusted under 35 U.S.C. 154(b) by 675 days.

(21) Appl. No.: 10/702,323

(22) Filed: Nov. 6, 2003

(65) Prior Publication Data

US 2005/0101368 A1 May 12, 2005

(51) Int. Cl.
*G06F 17/00* (2006.01)

(52) U.S. Cl. .................................................. 463/20

(58) Field of Classification Search .................. 463/20, 463/14, 15, 16–22, 25–29; 700/91

See application file for complete search history.

(56) References Cited

U.S. PATENT DOCUMENTS

| | | | | |
|---|---|---|---|---|
| 6,190,255 | B1 | 2/2001 | Thomas et al. | 463/20 |
| 6,443,452 | B1 | 9/2002 | Brune | 273/143 R |
| 6,511,375 | B1 | 1/2003 | Kaminkow | 463/20 |
| 6,514,141 | B1 | 2/2003 | Kaminkow | 463/20 |
| 6,561,904 | B2 | 5/2003 | Locke et al. | 463/25 |
| 6,575,830 | B2 | 6/2003 | Baerlocher et al. | 463/20 |
| 6,648,758 | B2 | 11/2003 | Bennett et al. | 463/20 |
| 6,659,464 | B1 * | 12/2003 | Champion et al. | 273/292 |
| 6,659,864 | B2 | 12/2003 | McGahn et al. | 463/16 |
| 6,729,618 | B1 | 5/2004 | Koenig et al. | 273/138.2 |
| 6,796,905 | B2 | 9/2004 | Baerlocher et al. | 463/25 |
| 6,811,483 | B1 | 11/2004 | Webb et al. | 463/16 |
| 6,890,257 | B2 | 5/2005 | Baerlocher | 463/25 |
| 7,331,863 | B2 * | 2/2008 | Baerlocher | 463/20 |
| 7,331,867 | B2 * | 2/2008 | Baerlocher | 463/25 |
| 2001/0046893 | A1 | 11/2001 | Giobbi et al. | 463/24 |
| 2002/0025846 | A1 | 2/2002 | Bennett et al. | 463/20 |
| 2003/0027619 | A1 * | 2/2003 | Nicastro, Sr. | 463/16 |
| 2003/0054872 | A1 | 3/2003 | Locke et al. | 462/20 |
| 2003/0069056 | A1 | 4/2003 | Cormack et al. | 463/16 |
| 2003/0162583 | A1 | 8/2003 | Baerlocher et al. | 463/20 |
| 2003/0162585 | A1 | 8/2003 | Bigelow, Jr. et al. | 463/20 |
| 2003/0211879 | A1 | 11/2003 | Englman | 463/20 |
| 2004/0018873 | A1 | 1/2004 | Hughs-Baird et al. | 463/20 |

(Continued)

OTHER PUBLICATIONS

"Spot The Dog" Brochure, by Olympic Video Gaming, (2 pages) undated.

*Primary Examiner*—Ronald Laneau
(74) *Attorney, Agent, or Firm*—Nixon Peabody LLP

(57) ABSTRACT

A gaming machine having a pick and spin bonus scheme is provided where, in response to a player selection from among a number of selections, or picks, (1) game play occurs yielding a game play outcome, and (2) a separate action occurs where the separate action is a result of the player selection. The final outcome therefore, is a combination of the result of the game play outcome plus the result of the separate action. For a slot machine having a pick and spin bonus scheme, in response to a player selection of a tile from a row of tiles where multiple rows of tiles form a grid, (1) video reels spin and stop yielding a game play outcome and (2) a separate action occurs where the separate action is a result of the player tile selection. The separate action may enhance, prolong or end bonus game play.

49 Claims, 9 Drawing Sheets

U.S. PATENT DOCUMENTS

2004/0023707 A1 2/2004 Maya et al. .................. 463/16
2004/0038731 A1 2/2004 Englman ..................... 463/25
2004/0053672 A1 3/2004 Baerlocher ................... 463/20
2004/0063493 A1 4/2004 Baerlocher ................... 463/25
2004/0219967 A1 11/2004 Giobbi et al. ................. 463/24
2005/0055115 A1* 3/2005 Gerrard et al. ............... 700/91
2005/0181855 A1* 8/2005 Englman et al. .............. 463/16
2005/0245309 A1 11/2005 Englman ..................... 463/20
2006/0068880 A1* 3/2006 Cannon ....................... 463/18
2006/0084500 A1* 4/2006 Baerlocher et al. ........... 463/25

* cited by examiner

500

700

GAMING MACHINE HAVING A PICK AND SPIN BONUS SCHEME

REFERENCE TO RELATED APPLICATIONS

This application is related to U.S. application Ser. No. 10/140,594 filed May 7, 2002 and entitled "Accumulation of Award Opportunities During Slot Game".

FIELD OF THE DISCLOSURE

This invention is directed to gaming machines, and more particularly, to a gaming machine having a pick and spin bonus scheme.

BACKGROUND

Gaming machines providing base games such as electronically driven video slots, video poker, video blackjack, video keno, video bingo, video pachinko, video lottery, and mechanically driven reel slots, etc., are well known in the gaming industry. Generally gaming machines are configured to operate as "stand-alone" units (that may or may not be coupled to a backroom computer) where the outcome of game play is "locally determined", or as part of a server-based gaming network where the outcome of game play may be either locally determined or "centrally determined".

Typically, video gaming machines are configured with a main video display for displaying video game images including video images representing game play outcome (e.g., simulated reel symbols in the case of a slot game, simulated cards, simulated numbers, etc.). In addition to displaying game play information (e.g., game outcome, status of game play including credits, lines bets, etc.), the main video display may be configured with a touch screen to allow player interaction. The player can make a number of game play selections by touching "virtual" buttons or particular touch-sensitive areas provided on the main video display. Alternatively, the player can make game play selections by depressing various electromechanical buttons provided on a player control panel of the gaming machine. Mechanical spinning reel slot machines, on the other hand, generally include a main reel display area configured to allow a player to view a reel symbol array provided by the stopped mechanical spinning reels. The player can make game play selections by depressing various electro-mechanical buttons provided on a player control panel.

Bonus games, typically initiated by an occurrence of a bonus triggering event during base game play, have been used in conjunction with base games to enhance overall wagering game play. Bonus game play is desirable because it generally results in some type of win for the player. Typical bonus game play may be either (1) a variation of base game play (e.g., same game with new pay table, better winning odds, new symbols, etc.) sans a wager or (2) a "new" game requiring some sort of player action such (e.g., the player making one or more selections from a number of choices, spinning a wheel, etc.), but not both. Thus, in the case of a slot game, the bonus triggering event may be an occurrence of particular symbols appearing on multiple reels and the bonus game may be a series of free spins. In another example, the bonus triggering event may be an occurrence of a particular bonus symbol on one reel and the bonus game may require the player to make one or more selections from among a number of possible selections.

SUMMARY OF THE INVENTION

In general, the present invention provides a gaming machine having a pick and spin bonus scheme where, in response to a player selection from among a number of selections, or picks, (1) game play occurs yielding a game play outcome, and (2) a separate action occurs where the separate action is a result of the player selection. The final outcome therefore, is a combination of the result of the game play outcome plus the result of the separate action.

For a slot machine having a pick and spin bonus scheme, in response to a player selection of a tile from a row of tiles where multiple rows of tiles form a grid, (1) video reels spin and stop yielding a game play outcome and (2) a separate action occurs where the separate action is a result of the player tile selection. The separate action may enhance the game play outcome, may prolong bonus game play, or may end bonus game play. Bonus game play ends when tokens, earned as a result of a bonus game triggering event and earned during subsequent bonus game play, are depleted due to the separate actions associated with the player tile selections. Thus, the player can continue bonus game play and therefore select one tile per row to accumulate award credits until a last tile from a last row is selected or until the bonus game is ended by one of the separate actions associated with one of the player tile selections.

In an embodiment, a method of conducting a pick and spin bonus scheme on a gaming machine is disclosed. The method includes displaying a pick and spin bonus game on a video display of the gaming machine, the pick and spin bonus game including a displayed grid and a plurality of displayed video reels, the displayed grid having a plurality of rows, each of the plurality of rows having a plurality of tiles. The method also includes enabling a first player selection of a first tile from a first row of the grid, detecting the first player selection of the first tile from the first row, causing the video reels to spin and stop to display a first outcome, and causing a first action associated with the first player selection in response to the first player selection of the first tile, and awarding a first award to the player based on the first outcome. The method further includes displaying a plurality of tokens on the video display prior to enabling the first player selection, the plurality of tokens resulting from a bonus triggering event occurring during wager base game play on the gaming machine. The first award may be a first credit amount resulting from the reel spin. If the first tile is a trap tile, a token is deleted from the plurality of tokens and a second player selection of a second tile from a second row is enabled if at least one row remains of the grid. Alternatively, if the first tile is a trap tile and no token is displayed on the video display, the first credit amount is added to a credit meter of the gaming machine and the pick and spin bonus game ends. If the first tile is a token tile, a token is added to the plurality of displayed tokens and a second player selection of a second tile from a second row is enabled if at least one row remains of the grid. If the tile from the first row is a multiplier, the first credit amount is multiplied by the multiplier to yield a first multiplied credit amount and a second player selection of a second tile from a second row is enabled if at least one row remains of the grid.

The method further includes enabling a second player selection of a second tile from among the plurality of tiles of a second row of the grid, where the plurality of tiles of the second row includes one safe tile with a known location and two hidden tiles with the first hidden tile including a trap tile and the second hidden tile including a token tile, where the second player selection of the one safe tile precludes loss of a token. Thus there are two types of rows in the displayed grid; one type of row where the actions associated with the tiles are unknown and another type of row where the actions associated with the tiles are partially known.

The method additionally includes enabling a last player selection of a last tile from a last row of the grid, detecting the last player selection of the last tile from the last row, in response to the last player selection, causing the video reels to spin and stop to display a last outcome, and enabling a secondary bonus game having a guaranteed award if the last tile is not a trap tile, and awarding a credit amount to the player based on the last outcome.

In an embodiment of the secondary bonus game, the secondary bonus game includes displaying a plurality of bonus award choices on the video display, detecting a bonus player selection of a bonus award choice from the plurality of bonus award choices and awarding a bonus credit amount to the player based on the bonus award choice.

In another embodiment, a method of conducting a pick and spin bonus scheme includes displaying a game on a video display of a gaming machine, the game including a plurality of player selections and a plurality of game play images, detecting a first player selection by a player from among the plurality of player selections, in response to the first player selection, causing the plurality of game play images to display a first outcome, and causing a first action associated with the first player selection, and awarding a first award to the player based on the first outcome. The game is preferably a bonus game, the plurality of game play images is preferably a plurality of video reels, and the first outcome is preferably a first reel symbol array. The plurality of game play images may, however, also include other wagering game play images (e.g., bingo, keno, poker, etc.) with the first outcome including suitable associated game outcome images. The plurality of player selections includes a grid of player selections, the grid including a plurality of rows, each of the plurality of rows having a plurality of tiles. The first player selection includes a player selection of a first tile from a first row of the grid. The method further includes displaying a plurality of tokens on the video display prior to detecting the first player selection where the plurality of tokens result from a bonus triggering event occurring during a wagering base game conducted on the gaming machine.

Additional aspects of the invention will be apparent to those of ordinary skill in the art in view of the detailed description of various embodiments, which is made with reference to the drawings, a brief description of which is provided below.

DESCRIPTION OF THE PREFERRED EXAMPLES

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

In general, the present invention provides a gaming machine having a pick and spin bonus scheme where, in response to a player selection from among a number of selections, or picks, (1) game play occurs yielding a game play outcome, and (2) a separate action occurs where the separate action is a result of the player selection. The final outcome therefore, is a combination of the result of the game play outcome plus the result of the separate action.

For a slot machine having a pick and spin bonus scheme, in response to a player selection of a tile from a row of tiles where multiple rows of tiles form a grid, (1) video reels spin and stop yielding a game play outcome and (2) a separate action occurs where the separate action is a result of the player tile selection. The separate action may enhance the game play outcome, may prolong bonus game play, or may end bonus game play. Bonus game play ends when tokens, earned as a result of a bonus game triggering event and earned during subsequent bonus game play, are depleted due to the separate actions associated with the player tile selections. Thus, the player can continue bonus game play and therefore select one tile per row to accumulate award credits until a last tile from a last row is selected or until the bonus game is ended by one of the separate actions associated with one of the player tile selections.

As described below, the present invention is preferably implemented using a video gaming machine. It is contemplated that the present invention may also be implemented using a mechanical spinning reel gaming machine having a secondary video display with a touch screen.

An advantageous feature of the gaming machine having a pick and spin bonus scheme is that, in response to a player selection from among a number of selections, or picks, (1) game play occurs yielding a game play outcome (e.g., a symbol array resulting in an award credits), and (2) a separate action occurs where the separate action is a result of the player selection (e.g., a token is acquired thereby extending bonus game play). The final outcome is a combination of the result of the game play outcome plus the result of the separate action. Unlike prior art bonus game play, therefore, the final outcome is not the result of the game play outcome only or the separate action only.

Figure 1:
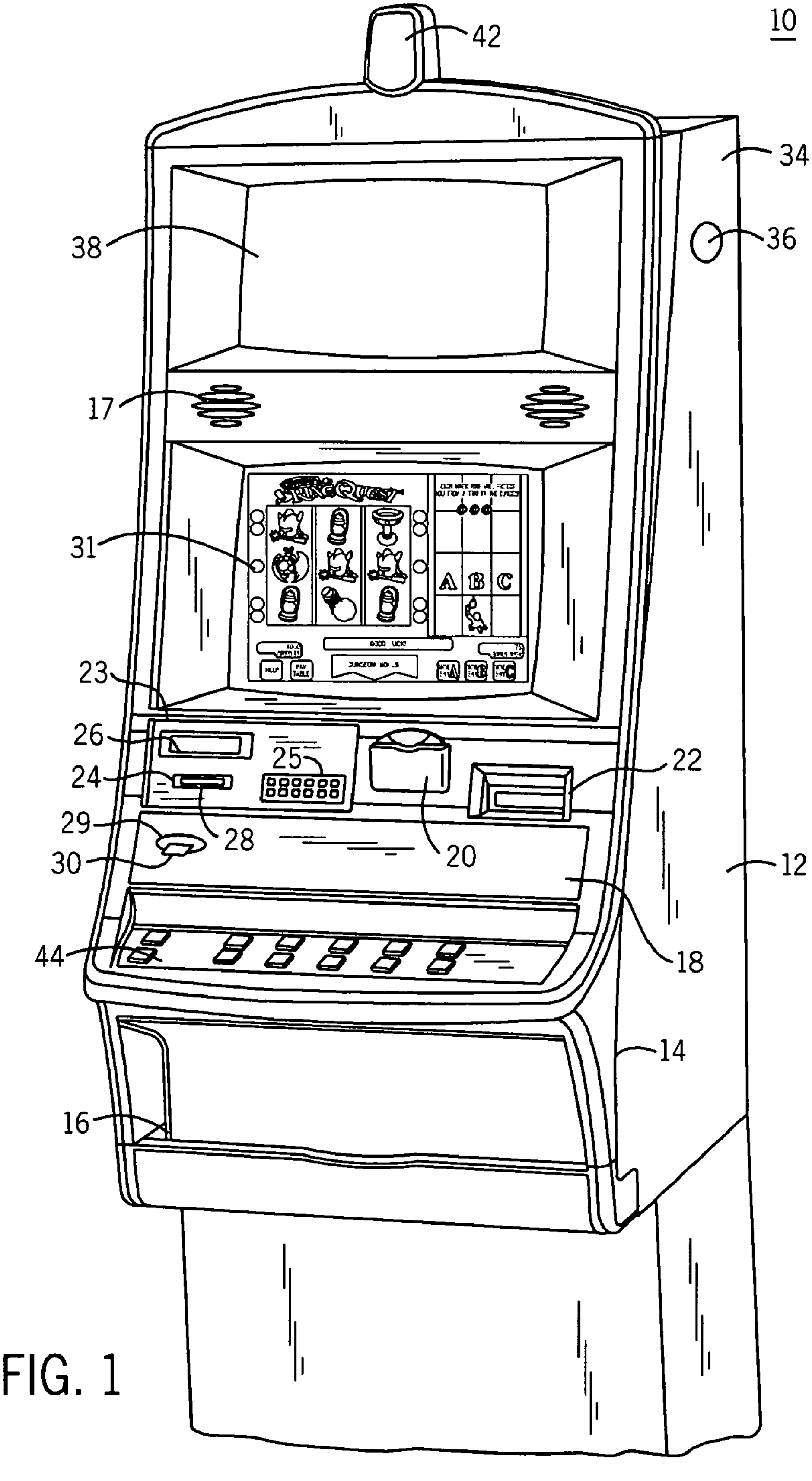
FIG. 1 is a perspective view of an embodiment of a gaming machine having a pick and spin bonus scheme in accordance the invention.

FIG. 1 is a perspective view of one possible embodiment of a gaming machine 10 offering a pick and spin bonus scheme. The gaming machine 10 may be any type of wagering gaming machine offering a pick and spin bonus scheme and may therefore have varying structures and methods of operation. For example, the gaming machine 10 may be a video gaming machine configured to play a video wagering game, or it may be a mechanical spinning reel slot machine (with or without and arm mechanism) having a touch screen. For exemplary purposes, various elements of the gaming machine 10 are described below, but it should be understood that numerous other elements may exist and may be utilized in any number of combinations to create a variety of gaming machine types.

Referring to FIG. 1, the gaming machine 10 includes a cabinet 12 having a door 14 to provide access to the interior of the gaming machine 10. Attached to the door 14 are audio speaker(s) 17 and a belly glass area 18 that typically displays game theme artwork. The audio speaker(s) 17 may be used to generate a variety of sounds such as the sound of spinning slot machine reels, a dealer's voice, music, announcements or any other audio related to the wagering game.

Also attached to the door 14 are a number of value input devices that allow a player to insert value for game play. The value input devices may include a coin slot acceptor 20 or a note acceptor 22 to input value to the gaming machine 10. The note acceptor 22 may accept value in any number of forms, including currency or a currency-sized paper ticket voucher inscribed with information such as a bar code representing value, the name of the casino, the date, etc. As used herein, the term "value" may encompass gaming tokens, coins, paper currency, ticket vouchers, credit or debit cards, smart cards, and any other object representative of value.

The gaming machine 10 may also include a player tracking area 23 having a card reader 24, a keypad 25 and a small display 26. As will be appreciated by those of ordinary skill in the art, the player tracking area 23 may be located in any number of areas of the gaming machine 10. The small display 26 may be implemented using a vacuum fluorescent display (VFD), a liquid crystal display (LCD), an LED display, and/or a touch screen to display information to a game player or casino employee. The card reader 24 may include any type of card reading device, such as a magnetic card reader, memory card reader, an optical card reader, etc. The card reader 24 may be used to read data from a card (e.g., a credit card, a player tracking card, a smart card, etc.) offered by a player. If provided for player tracking purposes, the card reader 24 may be used to read data from, and/or write data to, cards capable of storing data. Such data may include the identity of a player, the identity of a casino, the player's gaming habits, etc. Once gathered, the data can be "mined" (i.e., the data is sorted to identify patterns and establish relationships) for any number of purposes including administering player awards, distinguishing player preferences and habits, accounting, etc.

The gaming machine 10 also includes a main display device 31 for displaying video game images (e.g., simulated reel symbols, simulated cards, simulated numbers, etc.), or in the case of a mechanical spinning reel slot machine, for displaying a symbol array of artwork and blank symbols affixed to mechanical spinning reels viewable to the player. The symbol array may include occurrences of non-winning symbol combinations where no value payout is awarded to the player, or occurrences of winning symbol combinations (reflected in a pay table) where value payouts are awarded to the player. In addition, the main display device 31 may display animation, 2-D or 3-D images and digital video playback.

For video gaming machines, the main display device 31 may be implemented as a CRT, an LCD, a VFD, a plasma display, an organic liquid crystal display or other type of video display suitable for use in a gaming machine, and includes a touch screen. For example, in a video gaming machine offering a slot game, the main display device 31 may include an LCD-TFT display displaying video reel artwork symbols and blank symbols.

For mechanical spinning reel slot machines, the main display device 31 includes a reel display area and may additionally include a touch screen. Alternatively, the touch screen may be provided at a location disposed part from the main display device 31. The reel display area is adapted to display game information to a player while, at the same time, allowing the player to view the reel symbol array provided by the stopped mechanical spinning reels. The game information displayed to the player may include game denominations, available credits, pay lines, wagering information, and other suitable game information. When the mechanical spinning reels are rotated and stopped, the resulting symbol array in conjunction with game information displayed in the reel display area provide a game outcome and game status to the player.

Referring again to FIG. 1, the gaming machine 10 may also include a box top 34 having additional speaker(s) 36 and a top box display device 38. Although not separately illustrated, the top box display device 38 may include a camera and/or a microphone, and/or physical objects such as mechanical reels, wheels, or dice. The top box display device 38, if configured as a dynamic display (e.g., a flat panel video display), may enable a number of game enhancements such as bonus games, interactive tournament games, progressive jackpot games, etc. Alternatively, the top box display device 38, if configured as a static display, may display award information such as pay tables for base or bonus games via glass art.

The gaming machine 10 may also include a player control panel 44. The player control panel 44 may be provided with a number of pushbuttons or touch-sensitive areas (i.e., touch screen) that may be pressed by a player to select games, make wagers, make gaming decisions, etc. As used herein, the term "button" is intended to encompass any device that allows a player to make an input, such as a mechanical input device that must be depressed to make an input selection or a display area that a player may simply touch. The number of pushbuttons may include one or more "Bet" buttons for wagering, a "Max Bet" button for making the maximum wager allowable for the game, a "Play" button for beginning pay, a "Repeat" button for repeating the previous wagering selection, a "Collect" button for terminating play and cashing out of the game, a "Help" button for viewing a help screen, a "See Pays" button for causing the main display device 31 to generate one or more display screens showing the odds or payout information for the game or games provided by the gaming machine 10, and a "Call Attendant" button for calling an attendant. Further, although the player control panel 44 is shown to be separate from the main display device 31, it should be understood that the control panel 44 could be generated as a touch-sensitive screen by the main display device 31.

Referring again to FIG. 1, when a player inserts value in the gaming machine 10, credits corresponding to the amount deposited are displayed on a credit meter of the gaming machine 10. After depositing the appropriate amount of value and making appropriate selections, the player begins base game play by pulling a mechanical arm or by pushing an appropriate button such as a Bet button, a Max Bet button, or a Play button on the player control panel 44. Subsequent game play outcome displayed via the main display device 31 may be determined either centrally or locally (1) using a random number generator (RNG) resulting in a pseudo random set of outcomes, or (2) by selecting a game outcome from a fixed set of outcomes (pooled), or (3) other suitable technique. When triggered by a bonus triggering event such as an occurrence of selected symbols, a pick and spin bonus game is made available to the player. Like base game play, an outcome associated with bonus game play may be determined using an RNG, a fixed set of outcomes, or other suitable technique. Additional details describing game play on the gaming machine 10 having a pick and spin bonus scheme are included below as described in FIGS. 3 and 4.

Figure 2:
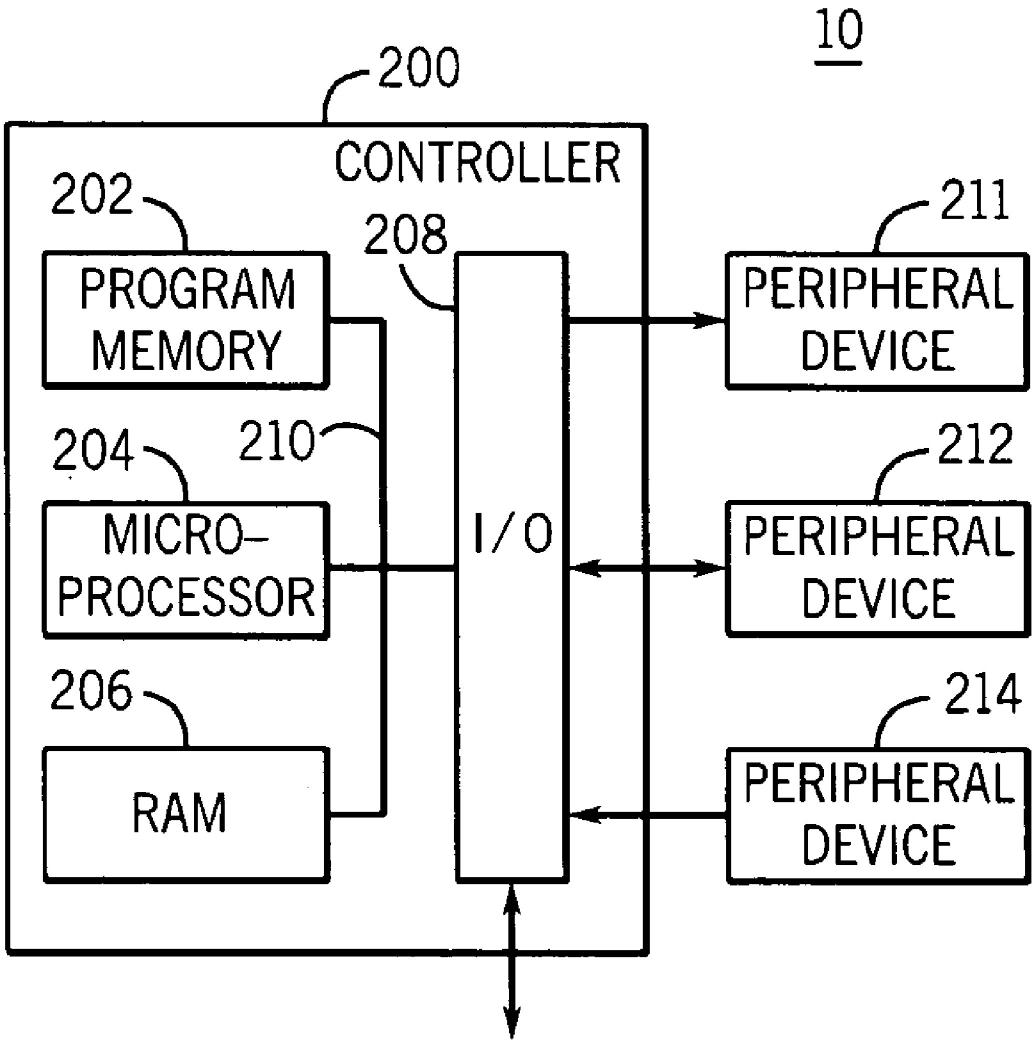
FIG. 2 is a block diagram of the electronic components of the gaming machine of FIG. 1.

FIG. 2 is a block diagram of a number of components that may be incorporated in the gaming machine 10 of FIG. 1. Referring to FIG. 2, the gaming machine 10, includes a controller 200 that may comprise a program memory 202 (including a read only memory (ROM)), a microcontroller-based platform or microprocessor (MP) 204, a random-access memory (RAM) 206 and an input/output (I/O) circuit 208, all of which may be interconnected via a communications link, or an address/data bus 210. The microprocessor 204 is capable of displaying images, symbols and other indicia such as characters, people, places, things, and faces of cards. The RAM 206 is capable of storing event data or other data used or generated during a particular game. The program memory 202 is capable of storing program code that controls the gaming machine 10 so that it plays a particular game in accordance with applicable math models, game rules, and pay tables. For example, when a bonus triggering event occurs, the microprocessor 204, executing code in the program memory 202, causes a pick and spin bonus screen to be displayed and then enables game subsequent pick and spin bonus game play.

It should be appreciated that although only one microprocessor 204 is shown, the controller 200 may include multiple microprocessors 204. For example, the controller 200 may include one microprocessor for executing low level gaming functions and another processor for executing higher-level game functions such as some communications, security, maintenance, etc. Similarly, the memory of the controller 200 may include multiple RAMs 206 and multiple program memories 202, depending on the requirements of the gaming machine 10. Although the I/O circuit 208 is shown as a single block, it should be appreciated that the I/O circuit 208 may include a number of different types of I/O circuits. The RAM(s) 206 and program memory(s) 202 may be implemented as semiconductor memories, magnetically readable memories, and/or optically readable memories, etc. Further, the term "controller" is used herein to refer collectively to the program memory 202, the microprocessor 204, the RAM 206 and the I/O circuit 208.

FIG. 2 illustrates that multiple peripheral devices, depicted as peripheral devices 211, 212, and 214, may be operatively coupled to the I/O circuit 208. The peripheral devices may include a control panel with buttons, a coin slot acceptor, a note acceptor, a bill validator, a card reader, a keypad, a sound circuit driving speakers, a card reader display, a video display, a touch screen, etc. In the case of a spinning reel slot machine, the peripheral devices may include a number of electromechanical spinning reels and a mechanical arm similarly coupled to the I/O circuit 208. Although three peripheral devices are depicted, more or less peripheral devices may be included.

It should be appreciated that although the controller 200 is a preferable implementation of the present invention, the present invention also includes implementation via one or more application specific integrated circuits (ASICs), field programmable gate arrays (FPGA), adaptable computing integrated circuits, one or more hardwired devices, or one or more mechanical devices.

One manner in which the gaming machine 10 may operate is described below in connection with one or more flowchart(s) that represents a number of portions or routines of one or more computer programs, which may be stored in one or more of the memories of the controller 200. The computer program(s) or portions thereof may also be stored remotely, outside of the gaming machine 10 and may therefore control the operation from a remote location.

Figure 3:
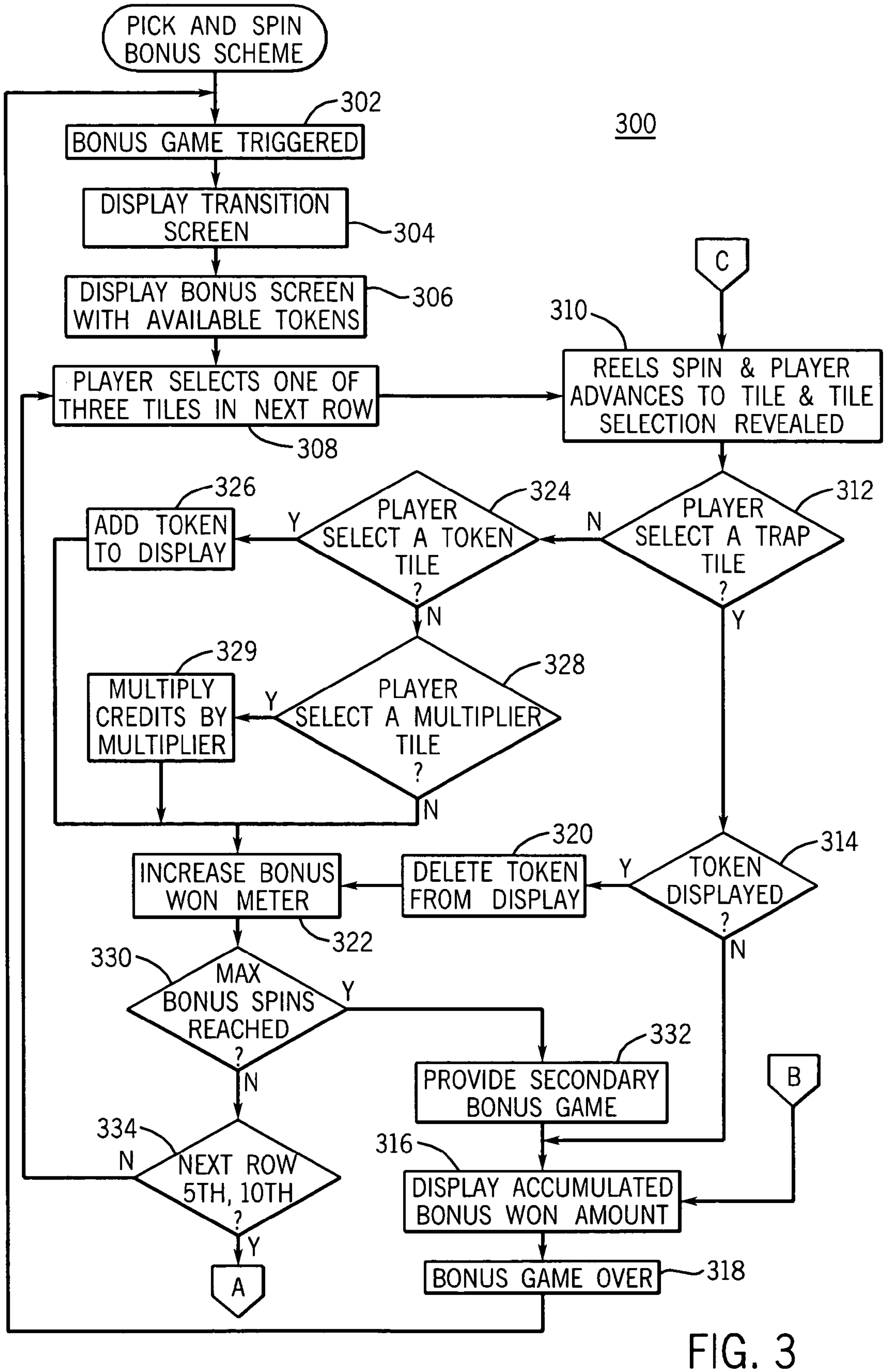
FIGS. 3-4 are a flowchart of an embodiment of a pick and spin bonus scheme routine that may be performed during game play of the gaming machine of FIG. 1.

FIG. 3 is a flowchart of a pick and spin bonus scheme routine 300 that may be performed by the controller 200 of the gaming machine 10 during base game play. Alternatively, the pick and spin bonus scheme routine 300 may be performed by another controller coupled to the gaming machine 10. The pick and spin bonus scheme routine 300 provides but one example of a bonus game where, in response to a player selection from among a number of selections or "picks", (1) game play occurs yielding an outcome, and (2) a separate action associated with the player selection occurs. Although discussed below in the context of a slot game for illustrative purposes, it is contemplated that the pick and spin bonus scheme routine 300 may be executed in conjunction with any number of other wagering base or bonus games provided by gaming machines.

Referring to FIG. 3, the pick and spin bonus scheme routine 300 begins operation when the controller 200 detects a bonus triggering event during base game play (step 302). The bonus triggering event may one of any number of pre-selected events such as an occurrence of selected symbols scattered within an array of symbols, an occurrence of selected symbols at particular positions within an array, an occurrence of one symbols, etc. Upon occurrence of the bonus triggering event, the controller 200 causes a transition screen to be displayed on the video display 31 (step 304) to inform the player that pick and spin bonus game play is imminent. A bonus screen signaling the beginning of pick and spin bonus game play is then displayed by the controller 200 (step 306).

Figure 5:
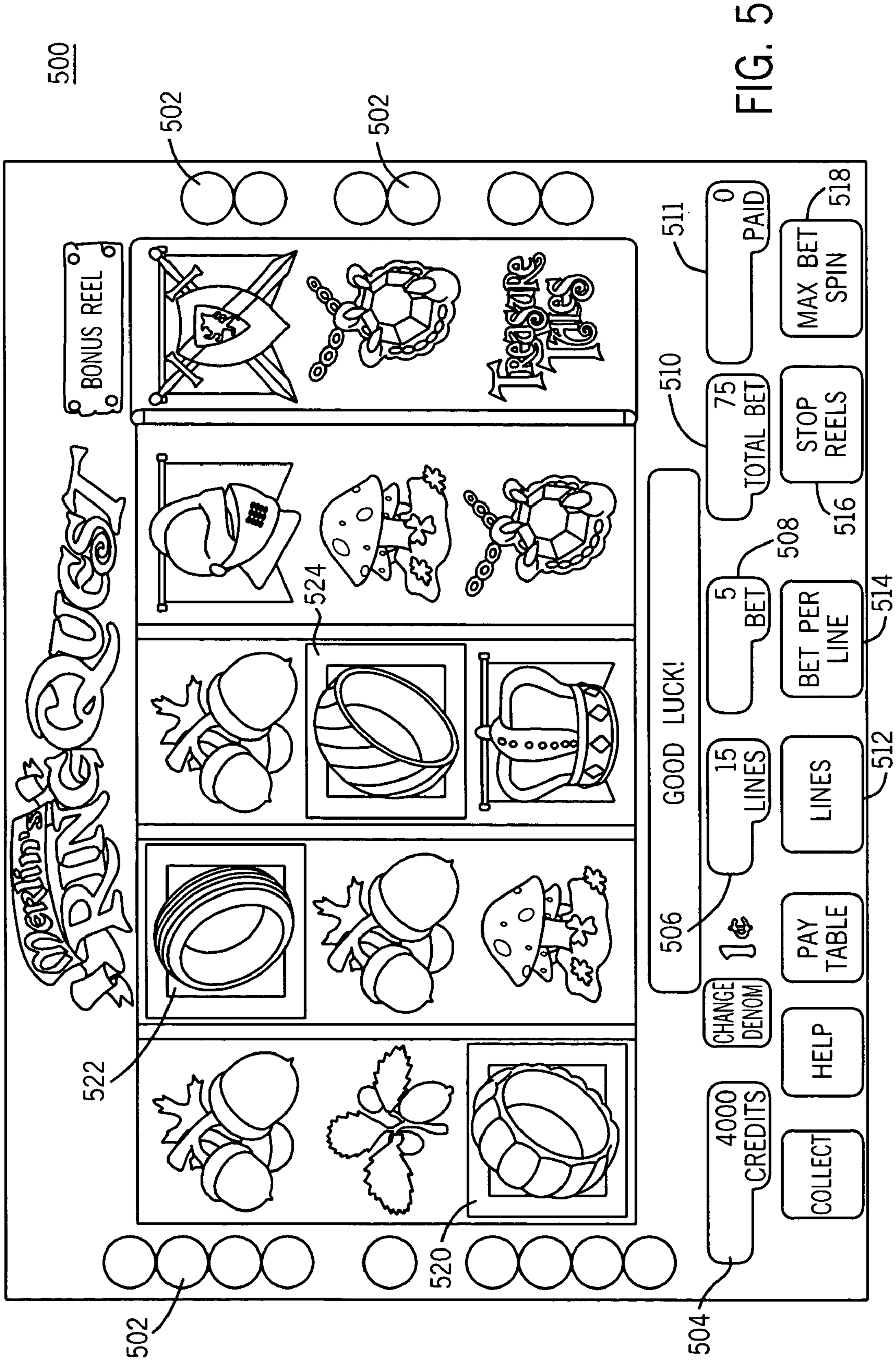
FIG. 5 is an exemplary display screen that may be displayed on the gaming machine of FIG. 1 during an occurrence of a bonus triggering event initiating the pick and spin bonus scheme.

For example, FIG. 5 is an exemplary display screen 500 that may be displayed on the main display device 31 when the bonus triggering event occurs during base game play. The exemplary display screen 500 includes an array of symbols (e.g., an array of 15 symbols) displayed via five virtual reels. In the illustrated example, an occurrence of three of pre-selected symbols, three gold rings 520, 522, 524, on varied positions of reel one, two, and three, provide the bonus triggering event causing a transition from base game play to pick and spin bonus game play. Although the occurrence of three gold rings trigger the transition to the pick and spin bonus game, other symbols and symbol combinations are contemplated.

The exemplary display screen 500 also includes multiple pay lines 502 and a video dashboard having a credit meter 504 for displaying a number of credits available for base game play (e.g., 4000 credits), a pay line indicator 506 for displaying the number of pay lines selected (e.g., 15 pay lines), a bet indicator 508 for displaying the number of credits wagered per pay line for a current game (e.g., 5 credit), a total bet indicator 510 for displaying the total credits wagered (e.g., 75 credits), and a paid indicator 511 for displaying credits won, if applicable, for the wager. Also included are a number of player selectable buttons such as a select line button 512, a bet per line button 514, a spin/stop reels button 516, a max bet spin button 518, etc. Although illustrated as virtual touch screen buttons, the player selectable buttons may also be configured as mechanical buttons.

Figure 6:
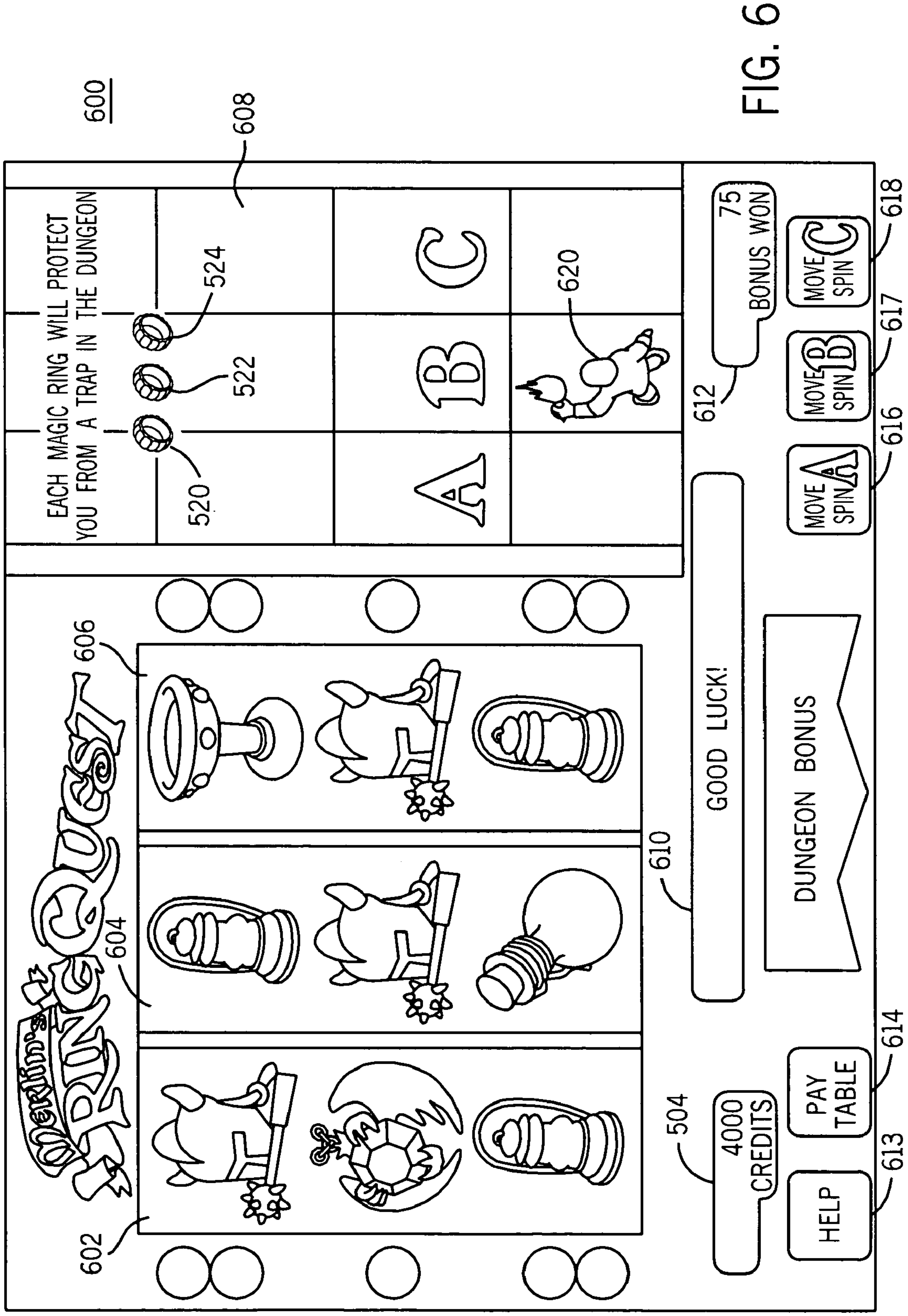
FIGS. 6-9 are a series of exemplary display screens that may be displayed during performance of the pick and spin bonus scheme routine of FIGS. 3 and 4.

FIG. 6 is an exemplary display screen 600 that may be initially displayed on the main display device 31 when the pick and spin bonus game begins. The exemplary display screen 600 includes an array of symbols (e.g., an array of 9 symbols) displayed via three virtual reels 602, 604, 606, a grid 608 having a number of rows (e.g., 15 rows) with each row having a number of tiles (e.g., 3 tiles per row), a number of information fields, and a number of virtual buttons. The information fields include the credit meter 504 for displaying a number of credits available for base game play (e.g., 4000 credits), a bonus won indicator 610 for displaying credits won during one free spin, and a bonus won meter 612 for displaying total credits won during bonus game play. The virtual buttons include a help button 613, a bonus pay table button 614, and three tile selection buttons 616, 617, 618.

The grid 608 preferably includes 15 rows having three tiles per row for a total of 45 tiles, however other configurations are contemplated. The left most tiles are denoted as "A" tiles and correspond to the tile selection button 616, the center tiles are denoted as "B" tiles and correspond to the tile selection button 617, and the right most tiles are denoted "C" and correspond to the tile selection button 618. Although only the first, second and third rows are displayed in FIG. 6, the first, second and third rows are replaced, one by one, by the additional rows of the grid 608 during pick and spin bonus game play (see, FIGS. 6-8).

The exemplary display screen 600 also includes the three gold rings 520, 522, 524, hereinafter referred to as tokens, which resulted from the bonus triggering event. Each of the three tokens is significant during bonus game play because one token is used to offset one player fall into a virtual dungeon and allow the player to continue pick and spin bonus game play. An animated character 620, represents the player during the pick and spin bonus game.

Referring again to FIG. 3, the player is directed to select one of three tiles in the first row of the grid 608 (step 308). Player selection of the tile is accomplished via touching one of the three tile selection buttons 616, 617, 618. In response to a player selection of one of the tiles, the animated character 620 steps forward and onto the tile selected by the player, the video reels spin and stop yielding a game play outcome, the tile reveals a separate action (step 310), and one of a number of separate actions occurs. The separate actions preferably include a fall into the virtual dungeon causing loss of a token, accumulation of a token, an occurrence of a multiplier which is multiplied with credits won as a result of the video reel spin, or a do nothing action where the credits won as a result of the video reel spin are simply added to the bonus won meter 612. Thus, the tiles may include a "trap tile" resulting in the fall into the dungeon and loss of a token, a "multiplier tile" resulting in a multiplied credit award, a "token tile" resulting in a token, or a "safe tile" resulting in the credit award being added to the bonus won meter 612. As will be appreciated by those of ordinary skill in the art, the credits awarded to the player as a result of a player multiplier tile selection may be represented by one of many game themed awards. For example, the credits awarded may be associated with a bag of gold, individual gold coins or a scroll uncovered by the tile selection.

If the player selects a trap tile (step 312) and no token is displayed on the display screen 600, the controller 200 causes the credits resulting from the spin to be added to the credits displayed on the bonus won meter 612 (step 316) and pick and spin bonus game play is ended. Upon detection of another wager, the controller 200 causes base game play to resume.

If the player selects a trap tile (step 312) and at least one token is displayed on the display screen 600, the controller 200 causes one token to be deleted from the display screen (step 320), the credits resulting from the reel spin are displayed on the bonus won indicator 610 and added to the credits displayed on the bonus won meter 612 (step 322). If there are rows remaining in the grid 608, the controller 200 enables player selection of one of the three tiles displayed in the next row.

If the player selects a token tile (step 324), the resulting token is added to the display screen 600 (step 326), the credits resulting from the reel spin are displayed on the bonus won indicator 610 and added to the credits displayed on the bonus won meter 612 (step 322). If there are rows remaining in the grid 608, the controller 200 enables player selection of one of the three tiles displayed in the next row.

If the player selects a multiplier tile (step 328), the controller 200 causes the multiplier to be revealed to the player, the credits resulting from the spin are displayed on the bonus won indicator 610, the credits resulting from the spin are multiplied by the multiplier (step 329) and are added to the credits displayed on the bonus won meter 612 (step 322). If there are rows remaining in the grid 608, the controller 200 enables player selection of one of the three tiles displayed in the next row.

In addition to the rows having three tiles where each tile is associated with an action revealed only upon selection of the tile, the pick and spin bonus scheme routine 300 preferably includes rows having three tiles where some selection information is provided to the player prior to player selection of one of the three tiles. Thus, the grid 608 includes two types of rows; a first type where the player is provided with no information with respect to the actions associated with the tiles (as discussed above) and a second type where the player is provided with some information with respect to the actions associated with the tiles. For example, the pick and spin bonus scheme routine 300 described in connection with FIGS. 3 and 4 preferably includes a grid having 15 rows where the $5^{th}$ and $10^{th}$ row are of the second type where the player is provided with some information with respect to the actions associated with the tiles, while all other rows are of the first type where the player is provided with no information with respect to the actions associated with the tiles. Therefore, if the player has completed a tile selection in four rows, the controller 200 displays some information with respect to the actions associated with the tiles in the next, or $5^{th}$, row (step 334).

Figure 7:
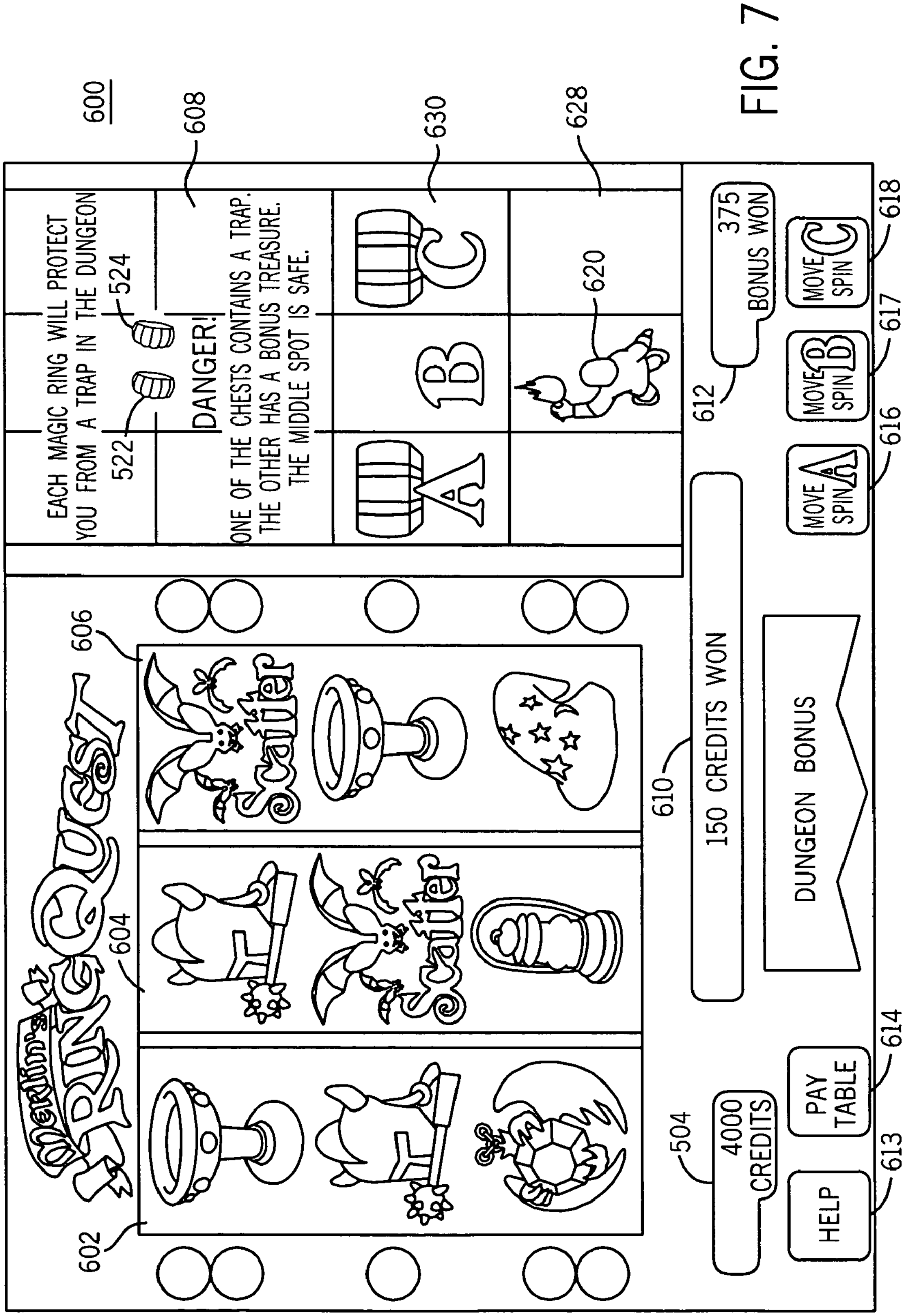

FIG. 7 is an exemplary display screen 600 that may be displayed on the main display device 31 where the player is provided with some selection information with respect to the actions associated with the tiles of the $5^{th}$ row 630 (i.e., the second row type). Referring to FIG. 7, the a bonus won indicator 610 displays 150 credits resulting from the $4^{th}$ free spin associated with a tile pick in the $4^{th}$ row 628, and displays 375 total credits resulting from the first four spins and actions associated with the first four tile picks. In another embodiment of the exemplary display screen 600, not separately illustrated, the bonus won indicator 610 may also display a break-down of the credits earned from the reel spin and the credits earned from the tile pick. For example, the bonus won indicator 610 may display 15 credits resulting from the reel spin, plus 60 credits resulting from the tile pick for a total of 75 credits. In addition, although not separately illustrated, the exemplary display screen 600 may also include a display counter indicating to the player the number of free spins used; in this case, the display counter would reflect 4 free spins. Also displayed are two gold rings 522, 524 (i.e., two tokens) indicating that one of the tiles selected in the first four rows was a trap tile that resulted in loss of the gold ring 520.

As shown in FIG. 7, the player is presented with three tiles where one of the tiles is a safe tile, another is a token tile, and yet another tile is a trap tile. The "A" tile corresponding to the tile selection button 616 and the "C" tile corresponding to the tile selection button 618 are represented with treasure chests which may contain a token or a trap. Thus, if the A tile is a token tile, then the C tile is a trap tile and visa versa. The "B" tile corresponding to the tile selection button 617 is a safe tile where selection of the safe tile precludes loss of a token.

Figure 4:
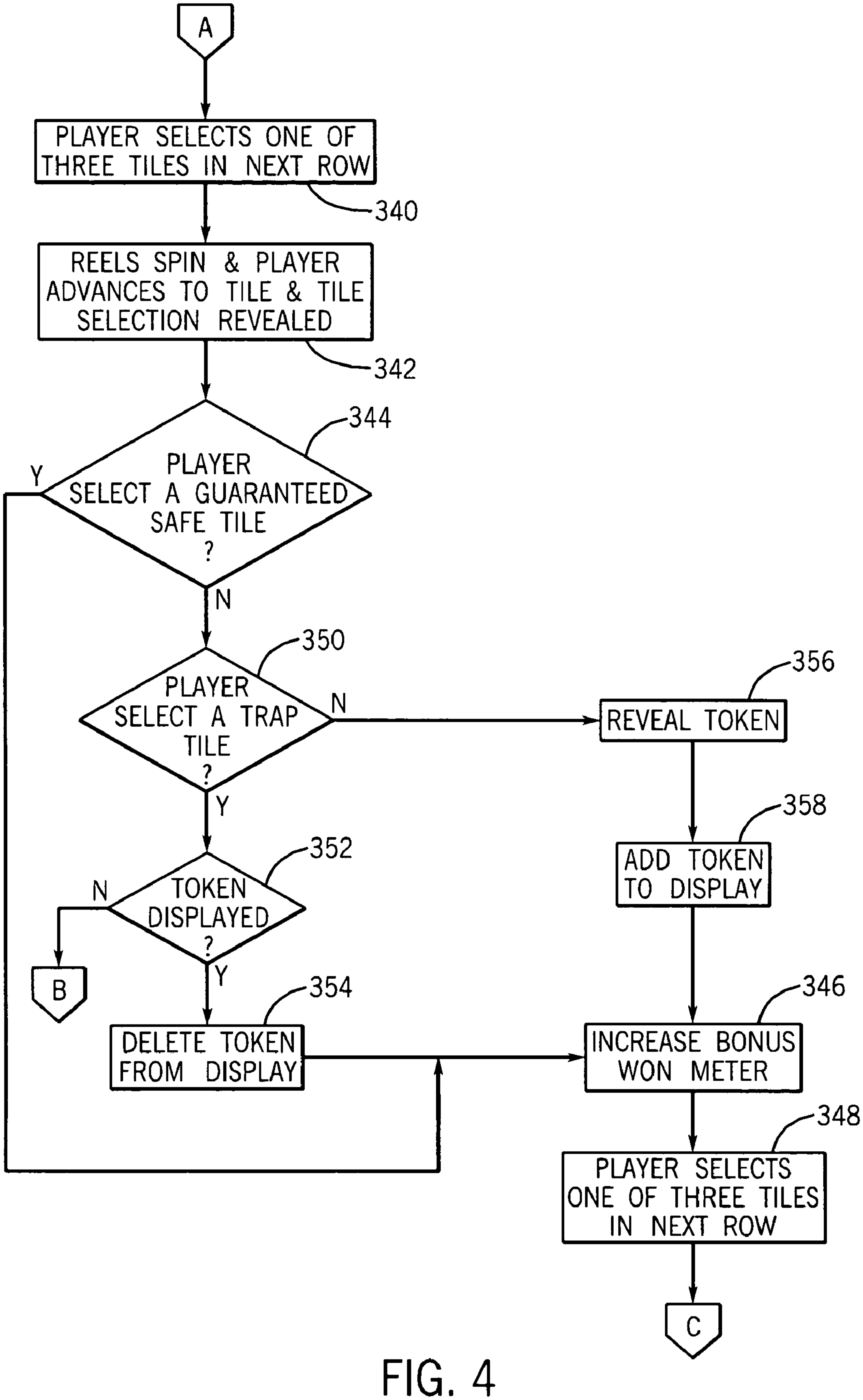

Referring to FIG. 4, in response to a player selection of one of the tiles from the $5^{th}$ row (step 340), the controller 200 causes (1) the animated character 620 to step forward and onto the selected tile, (2) the video reels spin and stop yielding a game play outcome, (3) a separate action associated with the selected tile to be revealed, (step 342) and (4) the separate action to occur. If the player selects the safe tile (step 344), the controller 200 causes the credits resulting from the spin to be displayed on the bonus won indicator 610 (step 346). If there are rows remaining in the grid 608, the controller 200 enables player selection of one of the three tiles displayed in the next row.

If the player selects a trap tile (step 350) and no token is displayed on the display screen 600, the controller 200 causes the credits resulting from the spin to be added to the credits displayed on the bonus won meter 612 (step 346) and pick and spin bonus game play is ended. Upon detection of another wager, the controller 200 causes base game play to resume. If the player selects a trap tile (step 350) and at least one token is displayed on the display screen 600, the controller 200 causes (1) one token to be deleted from the display screen (step 354), and (2) the credits resulting from the spin to be displayed on the bonus won indicator 610 and added to the credits displayed on the bonus won meter 612 (step 346). If there are rows remaining in the grid 608, the controller 200 enables player selection of one of the three tiles displayed in the next row.

If the player selects a token tile (step 356), the controller 200 causes (1) the resulting token to be revealed and added to the display screen 600 (step 358), and (2) the credits resulting from the spin to be displayed on the bonus won indicator 610 and also to be added to the credits displayed on the bonus won meter 612 (step 346). If there are rows remaining in the grid 608, the controller 200 enables player selection of one of the three tiles displayed in the next row.

Referring again to FIG. 3, if the player successfully reaches the last row of the grid 608 (i.e., maximum number of free spins completed) and does not select a trap tile (step 330), the player is entitled to participate in a secondary bonus game. If the player successfully reaches the last row of the grid 608 and selects a trap tile but has at least one token displayed on the display screen 600 (step 330), the player is also entitled to participate in a secondary bonus game.

Figure 8:
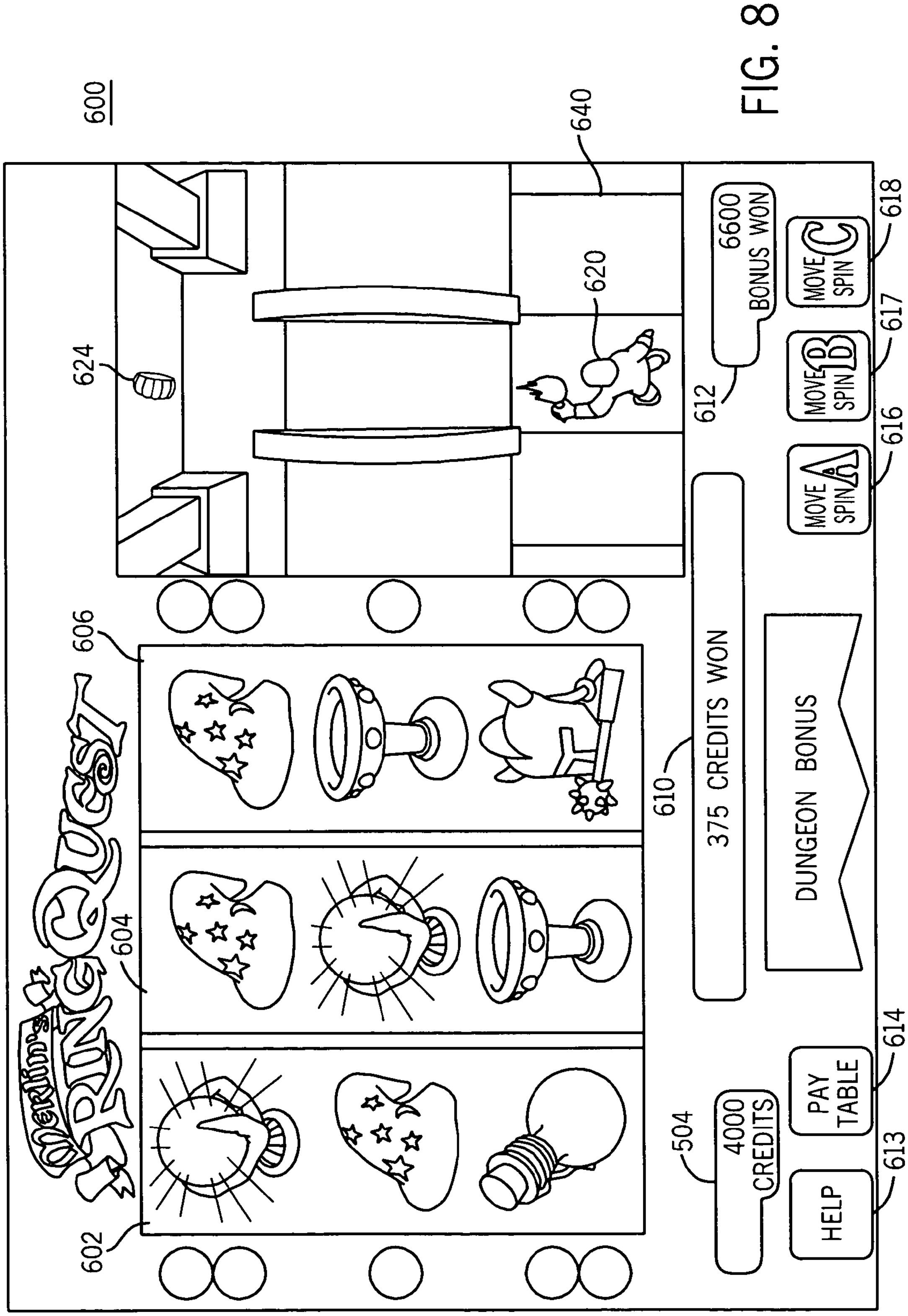

FIG. 8 is an exemplary display screen 600 that may be displayed on the main display device 31 when the player is entitled to participate in the secondary bonus game. Referring to FIG. 8, the bonus won indicator 610 displays 375 credits resulting from the $15^{th}$ free spin associated with a tile pick in the $15^{th}$ row 640, and displays 6600 total credits resulting from the fifteen spins and the separate actions associated with the fifteen tile picks. Also displayed is one token (e.g., the gold ring 524). As illustrated, the player represented by the character 620 appears to stand on the last row in preparation to cross the bridge to the secondary bonus game.

Figure 9:
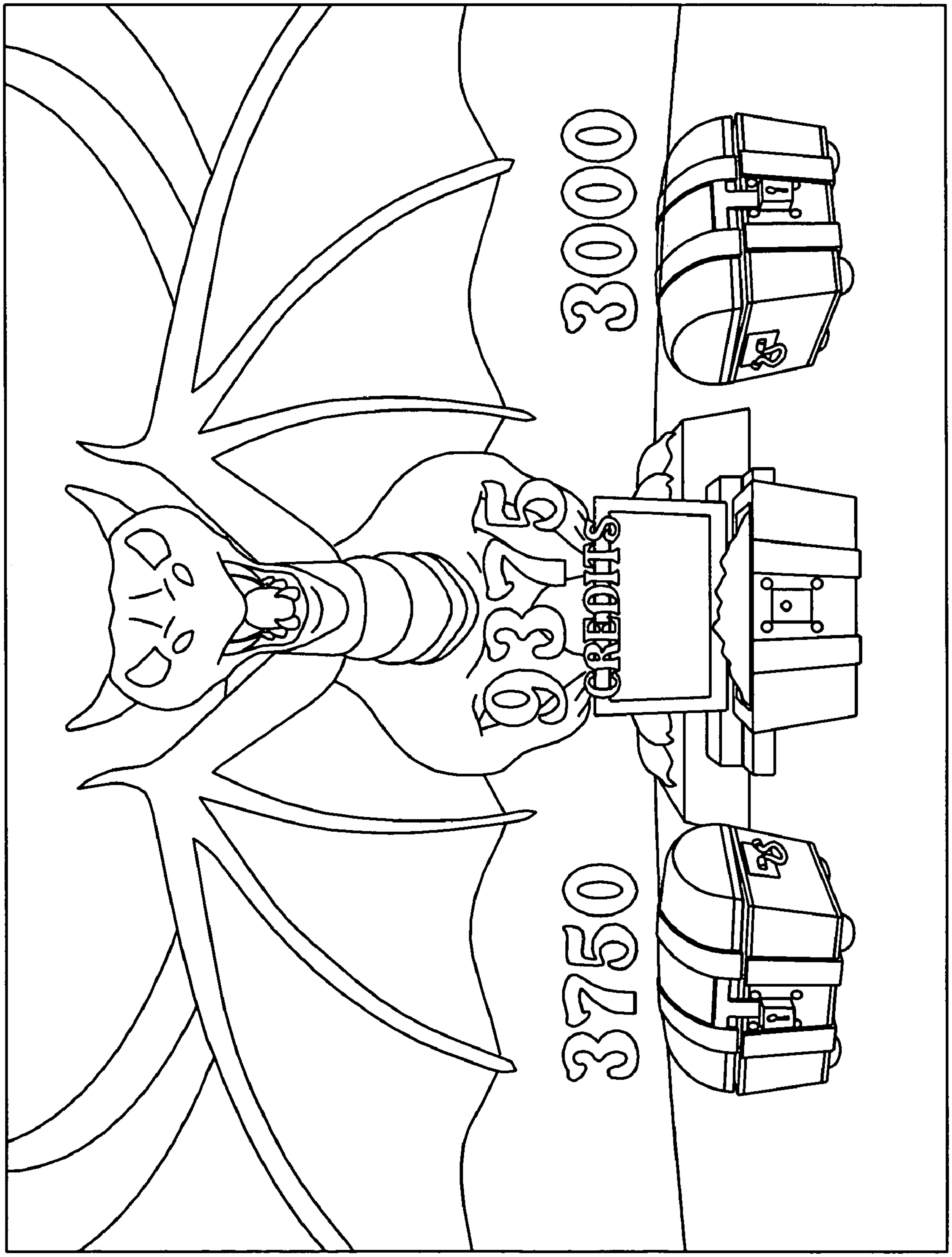

For example, FIG. 9 is an exemplary display screen 700 that may be displayed during the secondary bonus game after player selection of one of the three treasure chests. In keeping with the bonus game theme, the secondary bonus game preferably includes a "dragon's den" with a dragon presiding over three closed treasure chests. After crossing the bridge to the dragon's den, the player is instructed to select one of three closed treasure chests. Upon selection of one of the three closed treasure chests, the selected treasure chest is opened revealing a credit award which is subsequently added to the bonus won meter 612. The credits awards associated with the other two treasure chests are also revealed.

In the illustrated example, the player selects the middle treasure chest which yields 9375 credits. The controller 200 causes (1) the 9375 credits to be added to the bonus won meter 612, (2) statistics resulting from bonus and secondary bonus game play to be displayed, and (3) the pick and spin bonus game play to end. Upon detection of another wager, the controller 200 causes base game play to resume.

If, on the other hand, the player does not reach the last row of the grid 608 or if the player successfully reaches the last row of the grid 608 and selects a trap tile but no token is displayed on the display screen 600 (step 330), the controller 200 causes statistics resulting from bonus game play to be displayed, and pick and spin bonus game play is ended. Upon detection of another wager, the controller 200 causes base game play to resume.

Although discussed in the context of a dragon's den having a dragon presiding over three player selectable treasure chests, it is contemplated that the secondary bonus game may be one of any number of secondary bonus games awarded upon successful player completion of the pick and spin bonus game.

As may be apparent from the discussion above, the present invention of the gaming machine having a pick and spin bonus scheme is that, in response to a player selection from among a number of selections, or picks, (1) game play occurs yielding a game play outcome (e.g., a symbol array resulting in an award credits), and (2) a separate action occurs where the separate action is a result of the player selection (e.g., a token is acquired thereby extending bonus game play). The final outcome is a combination of the result of the game play outcome plus the result of the separate action. Unlike prior art bonus game play, therefore, the final outcome is not the result of the game play outcome only or the separate action only.

From the foregoing, it will be observed that numerous variations and modifications may be affected without departing from the scope of the novel concept of the invention. It is to be understood that no limitations with respect to the specific methods and apparatus illustrated herein is intended or should be inferred. It is, of course, intended to cover by the appended claims all such modifications as fall within the scope of the claims.

The invention claimed is:

1. A method of conducting a game on a gaming machine, the gaming machine including a controller having a processor and a memory, the method comprising:

displaying the game on a video display of the gaming machine, the game including a displayed grid and a plurality of displayed video reels, the displayed grid having a plurality of rows, each of the plurality of rows having a plurality of tiles;

enabling a first player selection of a first tile from a first row of the displayed grid;

detecting the first player selection of the first tile from the first row;

in response to the first player selection, causing the plurality of video reels to spin and stop to display a first outcome, and causing a first action associated with the first player selection;

awarding a first award to the player based on the first outcome;

enabling a second player selection of a second tile from among a plurality of tiles of a second row of the grid;

detecting the second player selection of the second tile from the second row;

in response to the second player selection, causing the video reels to spin and stop to display a second outcome, and causing a second action associated with the second player selection; and awarding a second award to the player based on the second outcome.

2. The method of claim 1, wherein the method further includes displaying a plurality of tokens on the video display prior to enabling the first player selection.

3. The method of claim 2, wherein the game comprises a bonus game, and wherein play of the bonus game is initiated by a bonus triggering event occurring during a wagering base game conducted on the gaming machine, the bonus triggering event resulting in the plurality of tokens displayed on the video display.

4. The method of claim 3, wherein the first award comprises a first credit amount.

5. The method of claim 4, wherein the first tile comprises a trap tile.

6. The method of claim 5, wherein the first action comprises:

deleting a token from the plurality of displayed tokens; and enabling a second player selection of a second tile from a second row of the grid if at least one row remains of the grid.

7. The method of claim 5, wherein the first action comprises:

causing the game to end if no token is displayed on the video display; and causing the first credit amount to be added to a credit meter of the gaming machine.

8. The method of claim 4, wherein the first tile comprises a token tile.

9. The method of claim 8, wherein the first action comprises:

adding a token to the plurality of displayed tokens; and enabling a second player selection of a second tile from a second row of the grid if at least one row remains of the grid.

10. The method of claim 4, wherein the first tile comprises a multiplier.

11. The method of claim 10, wherein the first action comprises:

multiplying the first credit amount with the multiplier to yield a first multiplied credit amount, the first multiplied credit amount more valuable than the first credit amount, and enabling a second player selection of a second tile from a second row of the grid if at least one row remains of the grid.

12. The method of claim 3, wherein the plurality of tiles of the second row includes one safe tile and two hidden tiles, a first hidden tile of the two hidden tiles including a trap tile and a second hidden tile of the two hidden tiles including a token tile, a location of the one safe tile known to the player, the second player selection of the one safe tile precluding loss of a token.

13. The method of claim 12, wherein the second tile comprises the safe tile, wherein the second award includes a second credit amount, and wherein the second action includes enabling a third player selection of a third tile from a third row of the grid if at least one row remains of the grid.

14. The method of claim 12, wherein the second tile comprises the trap tile, and wherein the second action includes deleting a token from the plurality of displayed tokens and enabling a third player selection of a third tile from a third row of the grid if at least one row remains of the grid.

15. The method of claim 12, wherein the second tile comprises the token tile, and wherein the second action includes adding a token to the plurality of displayed tokens and enabling a third player selection of a third tile from a third row of the grid if at least one row remains of the grid.

16. The method of claim 3, further comprising:

enabling a last player selection of a last tile from a last row of the grid;

detecting the last player selection of the last tile from the last row;

in response to the last player selection, causing the video reels to spin and stop to display a last outcome, and enabling a secondary bonus game having a guaranteed award if the last tile is not a trap tile; and awarding a last credit amount to the player based on the last outcome.

17. The method of claim 16, wherein the secondary bonus game comprises:

displaying a plurality of bonus award choices on the video display;

detecting a bonus player selection of a bonus award choice from the plurality of bonus award choices; and awarding a bonus credit amount to the player based on the bonus award choice.

18. The method of claim 3, further comprising:

enabling a last player selection of a last tile from a last row of the grid;

detecting the last player selection of the last tile from the last row;

in response to the last player selection, causing the video reels to spin and stop to display a last outcome, and enabling a secondary bonus game having a guaranteed award if the last tile is a trap tile and at least one token is displayed on the video display; and awarding a last credit amount to the player based on the last outcome.

19. A method of conducting a game on a gaming machine, the gaming machine including a controller having a processor and a memory, the method comprising:

displaying the game on a video display of the gaming machine, the game including a plurality of player selections and a plurality of game play images;

detecting a first player selection by a player from among the plurality of player selections;

in response to the first player selection, causing the plurality of game play images to display a first outcome, and causing a first action associated with the first player selection;

awarding a first award to the player based on the first outcome;

enabling a second player selection of a second tile from among a plurality of tiles of a second row of the grid;

detecting the second player selection of the second tile from the second row;

in response to the second player selection, causing the video reels to spin and stop to display a second outcome, and causing a second action associated with the second player selection; and awarding a second award to the player based on the second outcome.

20. The method of claim 19, wherein the first award comprises a first credit amount.

21. The method of claim 20, wherein plurality of player selections comprise a grid of player selections, the grid including a plurality of rows, each of the plurality of rows having a plurality of tiles.

22. The method of claim 21, wherein the first player selection comprises a player selection of a first tile from a first row of the grid.

23. The method of claim 22, wherein the method further includes displaying a plurality of tokens on the video display prior to detecting the first player selection.

24. The method of claim 23, wherein the game comprises a bonus game, and wherein play of the bonus game is initiated by a bonus triggering event occurring during a wagering base game conducted on the gaming machine, the bonus triggering event resulting in the plurality of tokens.

25. The method of claim 23, wherein the first tile comprises a trap tile.

26. The method of claim 25, wherein the first action comprises:

deleting a token from the plurality of displayed tokens; and enabling a second player selection of a second tile from a second row of the grid if at least one row remains of the grid.

27. The method of claim 25, wherein the first action comprises:

causing the game to end if no token is displayed on the video display; and causing the first credit amount to be added to a credit meter of the gaming machine.

28. The method of claim 23, wherein the first tile comprises a token tile.

29. The method of claim 28, wherein the first action comprises:

adding a token to the plurality of displayed tokens; and enabling a second player selection of a second tile from a second row of the grid if at least one row remains of the grid.

30. The method of claim 23, wherein the first tile comprises a multiplier.

31. The method of claim 30, wherein the first action comprises:

multiplying the first credit amount with the multiplier to yield a first multiplied credit amount, the first multiplied credit amount more valuable than the first credit amount, and enabling a second player selection of a second tile from a second row of the grid if at least one row remains of the grid.

32. The method of claim 23, wherein the plurality of tiles of the second row includes one safe tile and two hidden tiles, a first hidden tile of the two hidden tiles including a trap tile and a second hidden tile of the two hidden tiles including a token tile, a location of the one safe tile known to the player, the second player selection of the one safe tile precluding loss of a token.

33. The method of claim 32, wherein the second tile comprises the safe tile, wherein the second award includes a second credit amount, and wherein the second action includes enabling a third player selection of a third tile from a third row of the grid if at least one row remains of the grid.

34. The method of claim 32, wherein the second tile comprises the trap tile, and wherein the second action includes deleting a token from the plurality of displayed tokens and enabling a third player selection of a third tile from a third row of the grid if at least one row remains of the grid.

35. The method of claim 32, wherein the second tile comprises the token tile, and wherein the second action includes adding a token to the plurality of displayed tokens and enabling a third player selection of a third tile from a third row of the grid if at least one row remains of the grid.

36. The method of claim 23, further comprising:

detecting a last player selection of a last tile from a last row of the grid;

in response to the last player selection, causing the plurality of game play images to display a last outcome, and enabling a secondary bonus game having a guaranteed award if the last tile is not a trap tile; and awarding a last credit amount to the player based on the last outcome.

37. The method of claim 36, wherein the secondary bonus game comprises:

displaying a plurality of bonus award choices on the video display;

detecting player selection of a bonus award choice from the plurality of bonus award choices; and awarding a bonus credit amount to the player based on the bonus award choice.

38. The method of claim 23, further comprising:

detecting a last player selection of a last tile from the last row of the grid;

in response to the last player selection, causing the plurality of game play images to display a last outcome, and enabling a secondary bonus game having a guaranteed award if the last tile is a trap tile and at least one token is displayed on the video display; and awarding a last credit amount to the player based on the last outcome.

39. The method of claim 19, wherein the plurality of game play images comprise a plurality of video reels, and wherein the first outcome comprises a first reel symbol array.

40. A gaming machine comprising:

a video display device;

a controller coupled to the video display device, the controller including a processor and a memory coupled to the processor, the controller being programmed to:

display a game on the video display device, the game including a plurality of player selections and a plurality of game play images;

detect a player selection by a player from among the plurality of player selections;

in response to the player selection, cause the plurality of game play images to display an outcome, and cause an action associated with the player selection;

award a credit amount to the player based on the outcome;

enable a second player selection of a second tile from among a plurality of tiles of a second row of the grid;

detect the second player selection of the second tile from the second row;

in response to the second player selection, causing the video reels to spin and stop to display a second outcome, and causing a second action associated with the second player selection; and award a second award to the player based on the second outcome.

41. The gaming machine of claim 40, wherein plurality of player selections comprise a grid of player selections, the grid including a plurality of rows, each of the plurality of rows having a plurality of tiles.

42. The gaming machine of claim 41, wherein the player selection comprises player selection of a tile from a row of the grid.

43. The gaming machine of claim 42, wherein the controller is programmed to display a plurality of tokens on the video display prior to detecting the player selection.

44. The gaming machine of claim 42, wherein the game comprises a bonus game, and wherein play of the bonus game is initiated by a bonus triggering event occurring during a wagering base game conducted on the gaming machine, the bonus triggering event resulting in the plurality of tokens displayed on the video display device.

45. The gaming machine of claim 43, wherein the tile includes a trap tile, and wherein the action comprises deleting a token from the plurality of displayed tokens.

46. The gaming machine of claim 43, wherein the tile includes a trap tile, and wherein the action comprises ending the game if no token is displayed on the video display device.

47. The gaming machine of claim 43, wherein the tile includes a token tile, and wherein the action comprises adding a token to the plurality of tokens.

48. The gaming machine of claim 43, wherein the tile includes a multiplier, and wherein the action comprises multiplying the credit amount with the multiplier to yield a multiplied credit amount.

49. The method of claim 40, wherein the plurality of game play images comprise a plurality of video reels, and wherein the first outcome comprises a first reel symbol array.

* * * * *